UNITED STATES PATENT OFFICE.

MATHEW E. ROTHBERG, OF CRAFTON, PENNSYLVANIA, ASSIGNOR TO FALK COMPANY, OF PITTSBURGH, PENNSYLVANIA, A CORPORATION OF PENNSYLVANIA.

PROCESS FOR THE RECOVERY OF METALS FROM WASTE OILS.

1,170,342.

Specification of Letters Patent. Patented Feb. 1, 1916.

Application filed November 16, 1915. Serial No. 61,855.

No Drawing.

*To all whom it may concern:*

Be it known that I, MATHEW E. ROTHBERG, a citizen of the United States, resident of Crafton, in the county of Allegheny and State of Pennsylvania, have made a certain new and useful Invention in Processes for the Recovery of Metals from Waste Oils; and I declare the following to be a full, clear, and exact description of the same, such as will enable others skilled in the art to which it appertains to make and use the invention.

The invention has relation to the recovery of the metals or compounds thereof, contained in the waste oils or fats or mixture of oils and fats, occurring as a by-product in the process of coating or plating metal with tin, lead, zinc and the like. In this process, it is customary to use an oil, or a fat, or a combination of both, for the purpose of protecting the thin layer of metal from oxidation. A portion of these oils and fats is by the action of the metals and of heat gradually broken up into a viscous tarry compound, and into organic acids which combine with the metals, and is in the process now employed, a useless and burdensome by-product, there being no known method by which the metals contained in this waste can be profitably recovered.

It is the object of the present invention to recover the metals from these waste oils and fats in a practical and economical manner, and the invention consists in the novel process and procedure hereinafter set forth.

The process is as follows:—The waste oils are first cleaned of the mixed impurities, being then conducted into lead lined or earthenware receptacles, which are provided with suitable openings or pipes usually located at the bottoms thereof, and through which steam or compressed air is admitted for the purpose of agitating the contents. To the waste oils contained in the receptacle, is added a mineral acid or mixture of mineral acids, in such quantities as to be slightly in excess of the amount necessary to combine with the metals or organic salts of metals present, the whole being agitated as stated, when the metals or the metallic compounds will combine with the mineral acid added to form a salt or salts of such metals in solution. In this procedure care must be taken that the mineral acid added be of such strength as to form no emulsions of the salt solution with the oil. When sulfuric acid is used, a strength of from forty five to sixty six degrees Bé. would be correct. After the salt solution separates from the oil or oil salt mixture in the receptacle, said solution is drawn off into another or second receptacle, where the metal or metals can be precipitated as hydro-oxids by any well known reagent, or evaporated to dryness, and by calcination the sulfur driven off and replaced by oxygen of the air. In this way, the metals burn to oxids, which can be used in the arts in the reduction of metals and for other purposes. When hydrochloric acid is used, a strength of more than ten degrees Bé. is preferred.

The process of separation of the chlorids of the metals from the oils is the same as in the separation of the salts resulting in the use of sulfuric acid, but the treatment of the chlorids is as follows:—To the solution of the metals or salts thereof in hydrochloric acid is added finely divided iron or zinc, which having a greater affinity for the chlorin than the tin, will replace the same, the tin separating in the form of a sponge, which can be melted in crucibles at a low temperature. The zinc present can be precipitated by means of milk of lime as zinc oxid, a material of wide use in the arts.

I claim:—

1. A process for the recovery of metals and compounds thereof present in the waste oils and fats occurring as a by-product in the process of plating metals with tin, lead, zinc, and the like, said process consisting in treating said waste oils and fats with a mineral acid or acids of a strength that will form no emulsions of the resulting metallic salt solution with the oils.

2. A process for the recovery of metals and compounds thereof present in the waste oils and fats occurring as a by-product in the plating of metals with tin, lead, zinc, and the like, said process consisting in treating said waste oils and fats with a mineral acid or acids in quantity slightly in excess of the amount necessary to combine with the metals or organic salts of metals present and of a strength that will form no emulsions of the resulting metallic salt solution with the oils, at the same time agitating the mixture, separating the salt solution from the oils, and separating the metals from the salt solution.

In testimony whereof I affix my signature, in presence of two witnesses.

MATHEW E. ROTHBERG.

Witnesses:
I. A. SIMON,
E. MCCARTHY.